United States Patent
Caneva et al.

(10) Patent No.: US 8,985,159 B2
(45) Date of Patent: Mar. 24, 2015

(54) FLEXIBLE HOSE WITH KNITTING REINFORCEMENT AND PROCESS FOR ITS MANUFACTURING

(76) Inventors: Gianmarco Caneva, Altavilla (IT); Luigino Caneva, Altavilla (IT)

( * ) Notice: Subject to any disclaimer, the term of this patent is extended or adjusted under 35 U.S.C. 154(b) by 215 days.

(21) Appl. No.: 13/704,881

(22) PCT Filed: Jul. 4, 2011

(86) PCT No.: PCT/IB2011/001552
§ 371 (c)(1),
(2), (4) Date: Dec. 17, 2012

(87) PCT Pub. No.: WO2012/004646
PCT Pub. Date: Jan. 12, 2012

(65) Prior Publication Data
US 2013/0092276 A1    Apr. 18, 2013

(30) Foreign Application Priority Data

Jul. 7, 2010    (IT) .............................. VI2010A0189

(51) Int. Cl.
| | |
|---|---|
| *F16L 11/02* | (2006.01) |
| *D04B 21/20* | (2006.01) |
| *D04B 25/04* | (2006.01) |
| *D04B 39/04* | (2006.01) |
| *F16L 11/08* | (2006.01) |

(52) U.S. Cl.
CPC ............... *F16L 11/02* (2013.01); *D04B 21/205* (2013.01); *D04B 25/04* (2013.01); *D04B 39/04* (2013.01); *F16L 11/085* (2013.01)

USPC .......................................... 138/123

(58) Field of Classification Search
CPC ........ F16L 11/02; F16L 11/085; D04B 1/102; D04B 1/225; D04B 9/44; D04B 21/205; D04B 25/04; D04B 39/04
USPC .................................................. 138/123–125
See application file for complete search history.

(56) References Cited

U.S. PATENT DOCUMENTS

| | | | |
|---|---|---|---|
| 430,300 | A | 6/1890 | Rhome et al. |
| 2,108,735 | A * | 2/1938 | Wirth .............................. 66/207 |
| 2,870,619 | A | 1/1959 | Greczin |
| 3,201,954 | A | 8/1965 | Greczin |

(Continued)

FOREIGN PATENT DOCUMENTS

| | | |
|---|---|---|
| DE | 19730838 A1 | 11/1998 |
| EP | 0527512 A1 | 2/1993 |

(Continued)

*Primary Examiner* — J. Casimer Jacyna
(74) *Attorney, Agent, or Firm* — R. Neil Sudol; Henry D. Coleman (57) ABSTRACT

A flexible hose with knitted reinforcement has at least one inner tubular layer made of polymer material defining a longitudinal axis and at least one knitted reinforcement layer wound on the inner layer and having at least a first and a second series of yarns spiral wound on the inner layer and knitted together to form respective mesh courses that are inclined with respect to the axis and respective mesh wales substantially parallel to the axis. The mesh wales of the first series of yarns are superimposed on the second series of yarns to define a single-layer reinforcement knitting. A manufacturing method is provided.

11 Claims, 5 Drawing Sheets

(56) References Cited

U.S. PATENT DOCUMENTS

| | | | | |
|---|---|---|---|---|
| 3,578,028 | A | | 5/1971 | Roberts |
| 3,779,308 | A | * | 12/1973 | Buhrmann et al. ............ 165/51 |
| 3,882,857 | A | * | 5/1975 | Woodall, Jr. .................. 602/14 |
| 5,309,738 | A | | 5/1994 | Morris |
| 2011/0209791 | A1 | * | 9/2011 | Mezzalira .................... 138/126 |

FOREIGN PATENT DOCUMENTS

| | | |
|---|---|---|
| EP | 0623776 | 7/1993 |
| FR | 2793866 A1 | 11/2000 |
| FR | 2849148 A3 | 6/2004 |
| GB | 2199629 A | 7/1988 |
| WO | WO 03/035563 A1 | 5/2003 |

\* cited by examiner

FLEXIBLE HOSE WITH KNITTING REINFORCEMENT AND PROCESS FOR ITS MANUFACTURING

BACKGROUND OF THE INVENTION

The present invention has as object a flexible hose, particularly but not exclusively of the gardening type, provided with an inner mesh reinforcement structure. The invention also has as object a process for manufacturing such a reinforced hose.

Flexible gardening hoses are generally composed of an inner tubular layer and an external tubular layer made of polymer material, not necessarily of the same type.

Usually interposed between the two layers are one or more reinforcement layers configured as a function of the mechanical characteristics to be conferred to the hose, such as the resistance to bursting, the flexibility or the capacity to avoid the kinking phenomenon, i.e. the tendency of the hoses to be crushed when subjected to twisting with formation of a localized narrowing or obstruction.

The reinforcement layers are generally constituted by a textile, synthetic or natural fiber, wired or knitted with chain mesh of tricot type.

The reinforcement layer of wired type, if on one hand it ensures a limited expansion of the hose under pressure and is relatively simple and economical to produce, on the other hand has low resistance to kinking.

The reinforced layer of knitted type, while being more difficult and costly to make than the wired type, with respect to the latter resists much better to kinking, and hence is preferred in the case of medium-high level gardening hoses.

Nevertheless, the hose with knitted reinforcement is quite sensitive to variations of the internal pressure and reacts to the same by axially rotating, creating a number of difficulties in the case of use of hose-carrier trolleys and similar supports.

In order to overcome these drawbacks, gardening hoses have been made—one of which described in EP0623776—in which the knitted layer is formed by mesh wales and courses that are inclined with respect to the axis of the hose with opposite inclined angles.

Also in this case, however, there are non-negligible rotations under pressure, above all due to length or diameter variations of the hose which alter its geometry.

From FR2849148, an irrigation hose is known which is provided with two knitted reinforcement layers superimposed on each other and having mesh wales inclined with respect to the axis of the hose and mesh courses formed by parallel chains or meshes. The mesh courses of one of the layers are angularly spaced with respect to the mesh courses of the other layer in a manner so as to define a regular alternation of the mesh courses of the two knitted layers.

However, this solution has not proven to be satisfactory, since it is very difficult to achieve, and also has the drawback of defining overly wide spaces between the meshes, with consequent localized reduction of the resistance to bursting.

A further solution of hose with knitted reinforcement is known from U.S. Pat. No. 3,578,028, in which the reinforcement knitting is defined by mesh chains mutually intertwined in such a manner that the respective chain eyelets are partially superimposed on each other.

Nevertheless, also in this case the particular distribution of the mesh courses determines the presence of relatively wide empty spaces between the courses, spaces which represent clear points of lower resistance to the pressure.

In U.S. Pat. No. 3,201,954, a flexible hose is described having a reinforcement mesh formed by a spiraled portion and by a knitted portion.

The latter has chain eyelets distributed along mesh courses substantially parallel to the extension axis of the hose. In particular, each course has a plurality of slotted longitudinal eyelets in frontal contact with corresponding transverse sections.

Such solution has also not proven to be satisfactory, since it requires the presence of a large amount of yarn. In addition, it has poor resistance to kinking and twisting in the presence of high pressures, since the mesh wales defined by the different series of yarns have the same inclination angle.

OBJECTS OF THE INVENTION

The object of the present invention is to at least partially overcome the drawbacks mentioned above, by providing a high-performance and relatively inexpensive hose.

Another object of the invention is to make a flexible hose with knitted reinforcement structure which has high and uniform resistance to pressure and which is not subjected to rotation in the presence of pressure variations, in any case maintaining high malleability.

SUMMARY OF THE INVENTION

A flexible hose with knitted reinforcement comprises at least one inner tubular layer made of polymer material defining a longitudinal axis and at least one knitted reinforcement layer wound on the inner layer. The reinforcement layer comprises at least one first and one second series of yarns spiral wound on the inner layer and knitted together to form respective mesh courses inclined with respect to the axis and respective mesh wales substantially parallel to the axis. Each of the meshes is formed by a portion of a yarn of the first series forming a first chain eyelet and by a portion of a yarn of the second series forming a second chain eyelet and in which each of the first and second chain eyelets is substantially U-shaped with an open end and a closed end and with a pair of longitudinal sections spaced from one another at the open end and joined by a substantially transverse section at the closed end. For each of the meshes, the first chain eyelet and the second chain eyelet are substantially identical to each other and have the respective substantially longitudinal sections and substantially transverse sections completely substantially reciprocally superimposed to define a reinforcement knitting that is generally single-layer and locally of double-yarn type.

A process for manufacturing a flexible hose as described above comprises of making at least one inner layer of polymer material and subsequently knitting at least one first and one second series of yarns at the periphery of the inner layer to form on the same at least one knitted reinforcement. The knitting is carried out with the series of yarns placed in rotation with predetermined directions around the inner layer and by means of a plurality of needles configured for hooking respective yarns of the series and knitting them together in order to define mesh wales of the reinforcement layer. The needles are configured for hooking at least one yarn of the first series and/or of the second series and obtaining chain meshes defining mesh wales substantially parallel to the axis of the hose with mesh courses inclined with respect to the same. Each chain mesh comprises a first eyelet formed by a yarn of the first series and joined to a second chain eyelet formed by a yarn of the second series, the first eyelet and the second eyelet each having a substantially U-shaped form with an open end and a closed end and with respective pairs of longitudinal sections spaced from one another at the open end and joined by a substantially transverse section at the closed end. The needles are arranged for hooking a yarn of the first series and a yarn of the second series in such a manner that the first eyelet and the second eyelet of a same mesh result substantially identical with each other with respective substantially longitudinal sections and transverse sections completely substantially superimposed, to form a reinforcement knitting that is generally single-layer and locally of double-yarn type.

The single-layer knitting can be obtained by means of a circular knitting machine with a single knitting head in which each needle works simultaneously with a yarn of the first series and a yarn of the second series in order to make, by means of a single movement, a mesh formed by a first eyelet constituted by a portion of the yarn of the first series and by a second eyelet constituted by a portion of the yarn of the second series and superimposed on the first eyelet.

BRIEF DESCRIPTION OF THE DRAWINGS

Further characteristics and advantages of the invention will be clearer in light of the detailed description of several preferred but not exclusive embodiments of a hose according to the invention, illustrated as a non-limiting example with the aid of the drawing tables in which.

DETAILED DESCRIPTION

Figure 1:
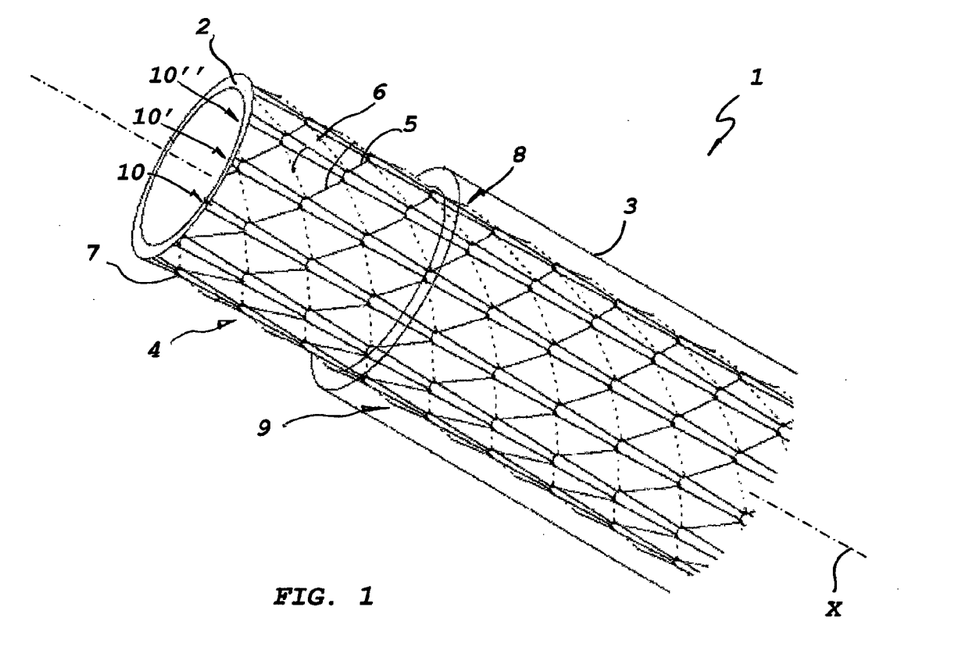
FIG. 1 is a perspective view of the hose according to the invention in a first preferred configuration with several details removed.
Figure 2:
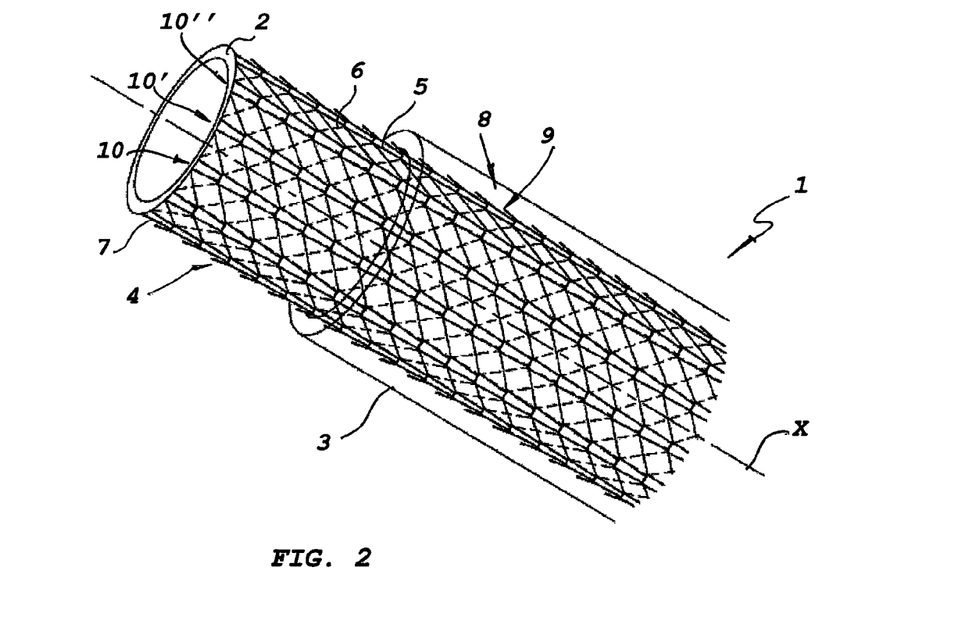
FIG. 2 is a perspective view of the hose according to the invention in a second preferred configuration with several details removed.

FIGS. 1 and 2 illustrate two preferred but non-exclusive embodiments of the hose according to the invention, generically indicated with 1, which can comprise an inner tubular layer 2, an external tubular layer 3 and a reinforcement layer 4 interposed between the two inner 2 and outer 3 tubular layers.

The inner layer 2 and the outer layer 3 can be made of polymer material, of plastic or rubber type, e.g. PVC. In a known manner, further layers can also be provided (not illustrated), placed inside the inner layer 2 and/or outside the outer layer 3.

The reinforcement layer 4 will be of knitted type with chain meshes of tricot type, and can be made of textile fiber, e.g. polyamide or polyester. Nevertheless, other synthetic or natural fiber types can also be used.

The inner 2 and outer 3 tubular layers will be substantially coaxial and will extend along a longitudinal axis X.

The knitted reinforcement layer 4 will be wound in a spiral on the inner layer 2 and will comprise a first and a second series of yarns, respectively 5 and 6, wound in a spiral on the inner layer 2.

The two series of yarns 5, 6 have helical progression with substantially identical pitch and will be knitted together to form a plurality of meshes 7, 7', 7", . . . arranged on mesh courses, respectively 8, 8', 8", . . . and 9, 9', 9", . . . inclined with respect to the longitudinal axis X and mesh wales 10, 10', 10", . . . substantially parallel to the axis X. In particular, the meshes 7, 7', 7", . . . will also be substantially longitudinal.

According to one characteristic of the invention, each mesh 7, 7', 7", . . . is formed by a portion of a yarn 5 of the first series which defines a first chain eyelet 11, 11', 11", . . . and by a portion of a yarn 6 of the second series which defines a second chain eyelet 12, 12', 12", . . . .

In addition, each chain eyelet 11, 11', 11", . . . ; 12, 12', 12", . . . is substantially U-shaped, with an open end and a closed end and with a pair of longitudinal sections, respectively 13, 14; 13', 14'; 13", 14", and 15, 16; 15', 16'; 15", 16", spaced from one another at the open end of the respective chain eyelet and joined to one another by substantially transverse section, respectively 17, 17', 17", . . . and 18, 18', 18" at the closed end of the respective chain eyelet.

In particular, for each mesh wales 10, 10', 10", . . . meshes 7, 7', 7" will be present, each formed by pairs of first chain eyelets 11, 11', 11", . . . ; and second chain eyelets 12, 12', 12", . . . substantially identical to each other and having both the respective substantially longitudinal sections 13, 14; 13', 14'; 13", 14", and 15, 16; 15', 16'; 15", 16" and the respective substantially transverse sections 17, 17', 17", . . . and 18, 18', 18", . . . superimposed in a substantially complete manner on each other in a manner so as to define a reinforcement knitting 4 that is generally single-layer and locally double-yarn.

Figure 3:
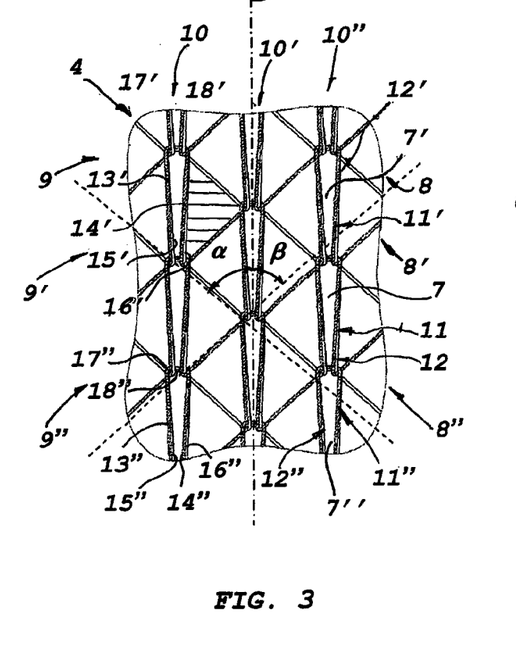
FIG. 3 is an enlarged front view of a detail of the hose of FIG. 1.
Figure 5:
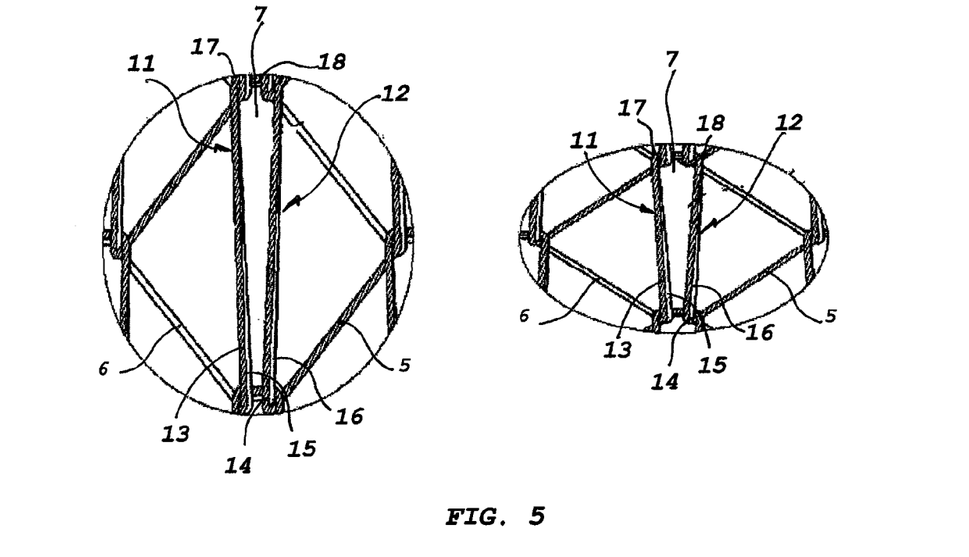
FIG. 5 is an enlarged view of a detail of FIG. 3 in two different configurations.

As is better visible in FIGS. 3 and 5, for each mesh 7, 7', 7", . . . the respective first eyelet 11, 11', 11", . . . and second eyelet 12, 12', 12", . . . can be radially and/or frontally superimposed, and in any case will be mutually knitted in order to define a single chain mesh 7, 7', 7", . . . .

Naturally, each mesh 7 will be linked to a pair of adjacent meshes 7', 7", . . . of the same wales 10, 10', 10", . . . each of such meshes 7', 7" being formed by a first eyelet 11', 11", . . . and by a second eyelet 12', 12", . . . substantially identical with each other and superimposed in a substantially complete manner.

Preferably, the mesh courses 8, 8', 8", . . . of the first series of yarns 5 will be inclined with respect to the axis X with inclination opposite to that of the mesh courses 9, 9', 9", . . . of the second series of yarns 6 with respective predetermined inclination angles α, β, which will preferably have equal but opposite value.

In a preferred but merely exemplifying manner, the inclination angles can have values comprised between 20° and 80° and still more preferably between 30° and 75°.

Advantageously, regardless of the respective inclination angles α, β, in a first configuration, illustrated in FIG. 1, the mesh courses 8, 8', 8", . . . of the first series of yarns 5 will be superimposed on the mesh courses 9, 9', 9", . . . of the second series of yarns 6 only at the respective eyelets 11, 11', 11", . . . ; 12, 12', 12", . . . .

This particular configuration will allow preventing the reinforcement layer 4 from having empty spaces between meshes 7, 7', 7", . . . of a same courses 8, 8', 8", . . . ; 9, 9', 9", . . . having excessive extension, which would lead to localized reduction of the resistance to the bursting of the hose 1 at these zones.

In this manner, the reinforcement layer 4 will be double-yarn, substantially only at the points of contact with the meshes 7, 7', 7", . . . .

Figure 4:
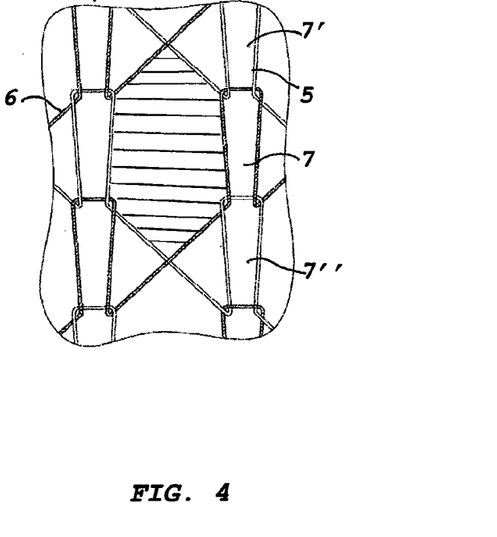
FIG. 4 is an enlarged front view of a detail of a hose of the prior art corresponding with the detail of FIG. 2.

The present invention will be even clearer by comparing FIG. 3 and FIG. 4, in which two details are depicted of the same portion of a knitted reinforcement layer 4 respectively of a hose 1 according to the invention and of a hose belonging to the state of the art, in which the meshes 7, 7', 7", . . . are only formed by yarn of one of the two series.

In a second configuration, illustrated in FIG. 2, the mesh courses 8, 8', 8", . . . of the first series of yarn 5 can be superimposed on the mesh wales 9, 9', 9", . . . of the second series of yarn 6, also at a zone interposed between contiguous mesh wales 10, 10', 10".

In particular, the two hoses have mesh courses 8, 8', 8", . . . with the same inclination. It is clear that the above-defined empty spaces, indicated with hatching in both the figures, have reduced extension for the hose 1 according to the invention with respect to the hose of the state of the art. In this manner, excessive localized swelling is prevented in the case of high internal pressures, increasing both the resistance to bursting and the kinking resistance properties.

The hose according to the invention can be obtained with a process that provides for a step of manufacturing the inner layer 2 in polymer material, e.g. by means of extrusion, and a subsequent step of knitting of the first 5 and second series 6 of yarns, at the periphery of the inner layer 2 in order to form the reinforcement layer 4 on the same.

In particular, the knitting step is executed with the two series of yarn 5, 6 placed in rotation with predetermined directions around the inner layer 2 and by means of a plurality of needles 19 configured to be moved parallel to the axis X of the inner layer 2 and to hook respective yarns 5, 6 and knit them together in order to define the mesh courses 8, 8', 8", . . . 9, 9', 9", . . . and the mesh wales 10, 10', 10", . . . of the reinforcement layer 4.

Each needle 19 can hook a yarn of one of the two series 5, 6 in order to make an eyelet 11, 12 designed to form a mesh 7.

For example, a needle 19 can hook a yarn of the first series 5 in order to form a first eyelet 11, while a contiguous needle can hook, simultaneously or subsequently, a yarn of the second series 6 in order to form a second eyelet 12 superimposed on the first eyelet 11.

Figure 9:
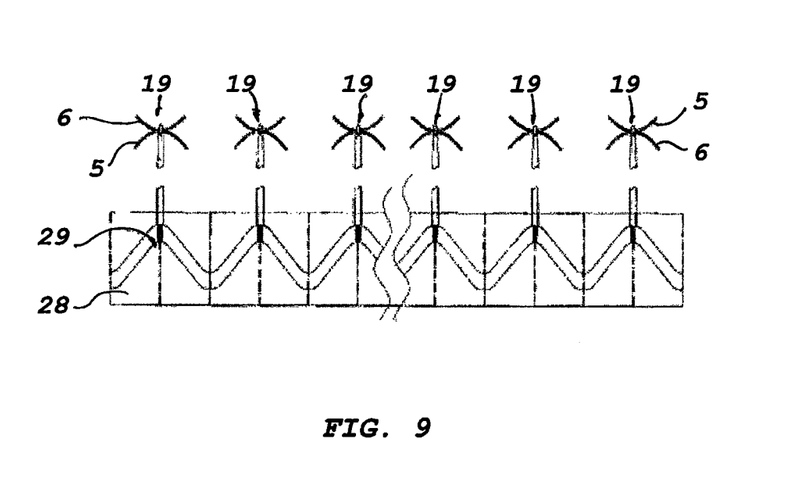
FIG. 9 is a schematic view of several needles of the knitting machine of FIG. 8 in a working sequence.

Advantageously, each needle 19 will be configured for simultaneously hooking a yarn of the first series 5 and a yarn of the second series 6, as is more clearly visible in FIG. 9.

In this manner, each needle 19 will achieve, with every longitudinal translation, a chain mesh 7, 7', 7", . . . comprising a first eyelet 11, 11', 11", . . . formed by a yarn portion of the first series 5 and a second eyelet 12, 12', 12", . . . formed by a yarn portion of the second series 6 identical to the first eyelet 11, 11', 11", . . . and superimposed on the same in a substantially complete manner, to form a reinforcement knitting that is generally single-layer and locally of double-yarn type.

In particular, the reinforcement layer 4 will have mesh wales 10, 10', 10", . . . substantially parallel to the axis X of the hose 1 and mesh courses 8, 8', 8", . . . 9, 9', 9", . . . inclined with respect to the same.

The two series of yarn 5, 6 will be mounted on substantially coaxial rotating plates 20, 20', brought into rotation with substantially identical speed in opposite direction in order to obtain mesh courses having equivalent and opposite inclinations with respect to the longitudinal axis X of the hose 1.

The process can then comprise all the additional steps necessary for completing the hose, such as the step of obtaining the outer layer 3, and such steps can vary as a function of the specific configuration of the hose 1.

Figure 6:
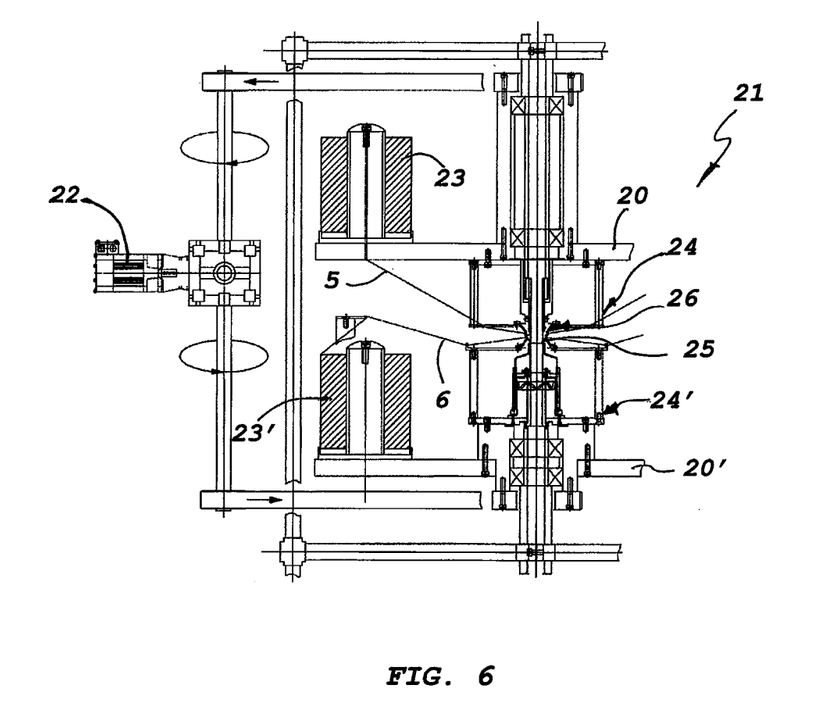
FIG. 6 is a schematic view of a detail of a knitting machine for making a hose according to the invention.
Figure 7:
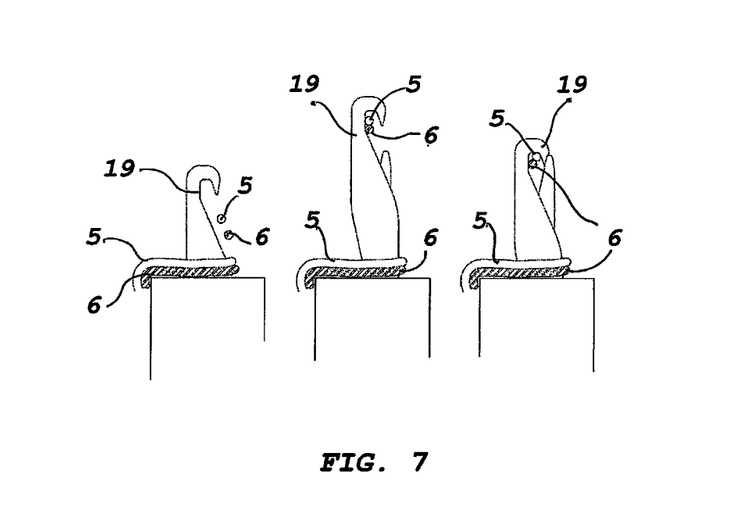
FIG. 7 is a schematic view of a needle of a knitting machine in a working sequence.
Figure 8:
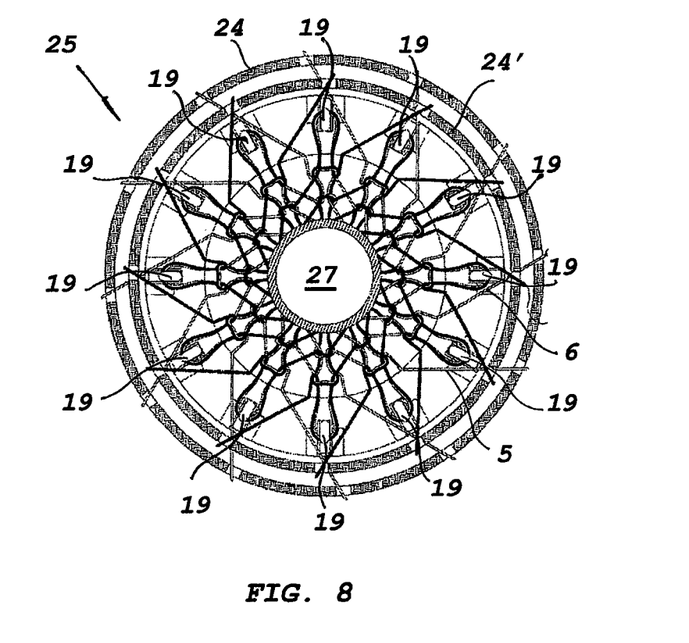
FIG. 8 is a front view in section of a detail of a knitting machine during knitting according to a first configuration.
Figure 10:
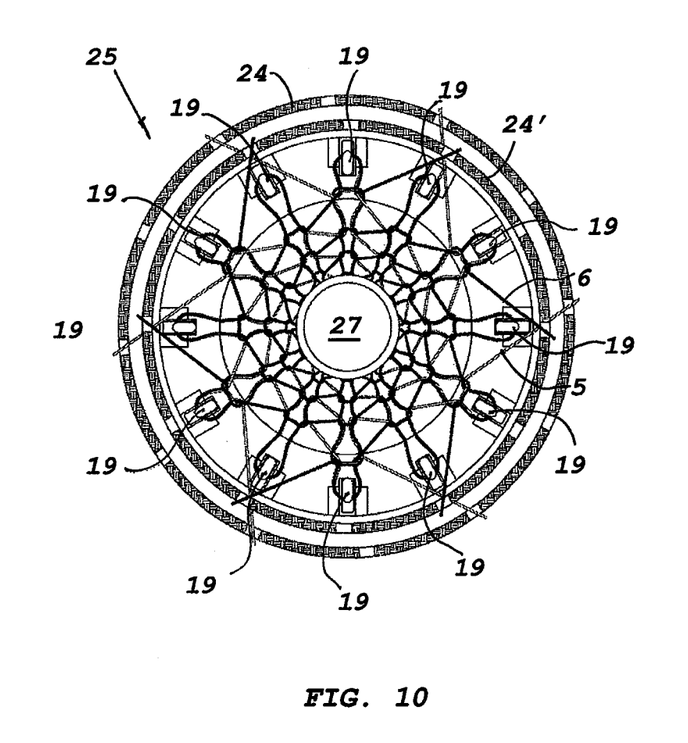
FIG. 10 is a front view in section of a detail of a knitting machine during knitting in a second configuration.

The knitted reinforcement layer 4 can be obtained with the knitting machine 21 illustrated in FIGS. 6, 8 and 10, having two spool-carrier plates 20, 20' that are both motorized and possibly connected to one same motor 22.

The two plates 20, 20' will be coaxial and rotatable around the longitudinal axis X defined by the hose 1. Each yarn of a series 5, 6 will come from a respective spool 23, 23', which can be present in the same number for each plate 20, 20'.

The latter will be associated with a device for distributing the yarns 24, 24', facing each other and mounted coaxial with the longitudinal axis X in order to be brought into rotation, preferably with the same speed and in opposite direction, and to wind the two series of yarn 5, 6 on the inner layer 2 with helical progression and inclination angles $\alpha$, $\beta$ that are equivalent and mutually opposite with respect to the axis X of the hose.

The machine 21 will also comprise a knitting head 25 having a sleeve 26, more clearly visible in FIG. 6, defining an axial passage 27 for the lower layer 2 around which the needles 19 are circularly arranged.

The knitting head 25 will also comprise a cam 28 operatively associated with the needles 19 in order to cause their alternating movement along respective longitudinal directions.

The cam 28 can have a number of crests 29 equal to the number of yarn of each series 5, 6 i.e. equal to a multiple or a submultiple of the number of yarns of each series 5, 6.

Each needle 19 will be configured to simultaneously hook and work a yarn of the first series 5 and a yarn of the second series 6 and obtain a single-layer knitted reinforcement 4 with each mesh wales 10, 10', 10", . . . defined both by yarns 5 of the first series and by yarns 6 of the second series. In particular, the single-layer knitted reinforcement 4 will be of the double-yarn type at the meshes 7, 7', 7", . . . in such a manner to have a resistance to the increased pressure associated with high malleability.

In addition, in a first configuration, illustrated in FIGS. 8 and 9, the needles 19 will be configured to translate all in a synchronous manner and to hook respective pairs of first yarns 5 and second yarns 6, so as to achieve a knitted layer 4 having a number of wales 10, 10', 10", . . . equal to the number of yarns of each series 5, 6.

Figure 11:
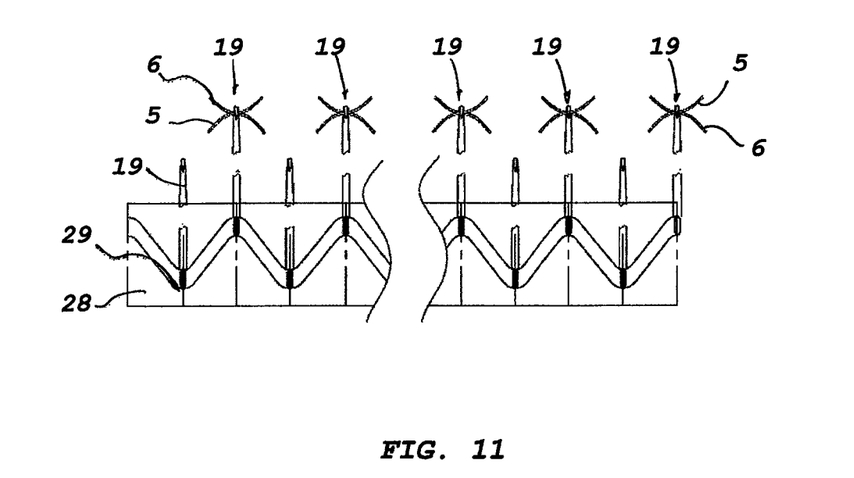
FIG. 11 is a schematic view of several needles of the knitting machine of FIG. 10 in a working sequence.

In an alternative configuration, shown in FIGS. 10 and 11, it will be possible to identify two separate series of needles 19 operating in an alternating manner with respect to each other, for manufacturing a knitted layer 5 having a number of wales 10, 10', 10" equal to double to the number of yarns of each series 5, 6.

From that described above, it is clear that the invention attains the pre-established objects, and in particular that of making a reinforcement mesh with high malleability and substantially unaffected by the expansion forces of the hose. The balanced structure of the knitting ensures that the twisting forces due to the pressure inside the hose are always compensated, even in the presence of variation of the inclination of the mesh courses, so that the hose is practically unaffected by the internal pressure variations of the transported fluid. The elementary meshes formed by means of knitting of both series of yarns confer malleability to the hose and reduce the possibility of its narrowing and obstruction.

The hose and the process according to the invention are susceptible to numerous modifications and variants, all falling within the inventive concept expressed in the enclosed claims.

The invention claimed is:

1. Flexible hose with knitted reinforcement, comprising at least one inner tubular layer made of polymer material defining a longitudinal axis and at least one knitted reinforcement layer wound on said inner layer, said reinforcement layer comprising at least one first and one second series of yarns spiral wound on said inner layer and knitted together to form respective mesh courses inclined with respect to said axis and respective mesh wales substantially parallel to said axis, in which each of said meshes is formed by a portion of a yarn of said first series forming a first chain eyelet and by a portion of a yarn of said second series forming a second chain eyelet and in which each of said first and second chain eyelets is substantially U-shaped with an open end and a closed end and with a pair of longitudinal sections spaced from one another at said open end and joined by a substantially transverse section at said closed end, wherein for each of said meshes, said first chain eyelet and said second chain eyelet are substantially identical to each other and have the respective substantially longitudinal sections and substantially transverse sections completely substantially reciprocally superimposed to define a reinforcement knitting that is generally single-layer and locally of double-yarn type.

2. Hose according to claim 1, wherein each pair of reciprocally superimposed eyelets of a first mesh is linked with both the reciprocally superimposed eyelets of two further meshes adjacent to the first.

3. Hose according to claim 1, wherein the mesh courses of said first yarn series are inclined with respect to said axis with inclination opposite that of the mesh courses of said second yarn series with respective predetermined inclination angles.

4. Hose according to claim 3, wherein the values of said inclination angles are equal to and opposite each other.

5. Hose according to claim 3, wherein said inclination angles have values comprised between 20.degree. and 80.degree. and preferably comprised between 30.degree. and 75.degree.

6. Process for manufacturing a flexible hose according to claim 1, comprising making at least one inner layer of polymer material and subsequently knitting at least one first and one second series of yarns at the periphery of said inner layer to form on the same at least one knitted reinforcement, in which said knitting is carried out with said series of yarns placed in rotation with predetermined directions around said inner layer and by means of a plurality of needles configured for hooking respective yarns of said series and knitting them together in order to define mesh wales of said reinforcement layer, said needles being configured for hooking at least one yarn of said first series and/or of said second series and obtaining chain meshes defining mesh wales substantially parallel to the axis of the hose and mesh courses inclined with respect to the same, in which each chain mesh comprises a first eyelet formed by a yarn of said first series and joined to a second chain eyelet formed by a yarn of said second series, said first eyelet and said second eyelet each having a substantially U-shaped form with an open end and a closed end and with respective pairs of longitudinal sections spaced from one another at the open end and joined by a substantially transverse section at the closed end, wherein said needles are arranged for hooking a yarn of said first series and a yarn of said second series in such a manner that said first eyelet and said second eyelet of a same mesh result substantially identical with each other with respective substantially longitudinal sections and transverse sections completely substantially superimposed, to form a reinforcement knitting that is generally single-layer and locally of double-yarn type.

7. Process according to claim 6, wherein each of said needles is designed for simultaneously hooking a yarn of said first series and a yarn of said second series to obtain meshes formed by pairs of first and second eyelets.

8. Process according to claim 6, wherein said series of yarns are mounted on substantially coaxial rotating plates rotatable with substantially equal speed and in opposite directions to obtain mesh courses having equal and opposite inclination with respect to said axis.

9. Process according to claim 8, wherein said needles are mounted on a knitting head provided with a cam adapted to move said needles with a substantially longitudinal, alternating translational movement.

10. Process according to claim 8, wherein said cam has a number of crests equal to the number of yarns of each of said series.

11. Process according to claim 8, wherein said cam has a number of crests equal to a multiple or submultiple of the number of yarns of each of said series.

\* \* \* \* \*